US012602875B2

(12) United States Patent
Chen et al.

(10) Patent No.: US 12,602,875 B2
(45) Date of Patent: Apr. 14, 2026

(54) TECHNIQUE FOR THREE DIMENSIONAL (3D) HUMAN MODEL PARSING

(71) Applicant: QUALCOMM Incorporated, San Diego, CA (US)

(72) Inventors: Kunyao Chen, San Diego, CA (US); Junkang Zhang, San Diego, CA (US); Zhen Wang, San Diego, CA (US); Lei Wang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 18/608,796

(22) Filed: Mar. 18, 2024

(65) Prior Publication Data

US 2025/0292505 A1      Sep. 18, 2025

(51) Int. Cl.
| | |
|---|---|
| *G06T 17/20* | (2006.01) |
| *G06T 7/12* | (2017.01) |
| *G06T 7/40* | (2017.01) |
| *G06V 20/70* | (2022.01) |
| *H04N 13/279* | (2018.01) |

(52) U.S. Cl.
CPC ................ *G06T 17/20* (2013.01); *G06T 7/12* (2017.01); *G06T 7/40* (2013.01); *G06V 20/70* (2022.01); *H04N 13/279* (2018.05)

(58) Field of Classification Search
CPC .. G06T 17/20; G06T 7/12; G06T 7/40; G06T 7/11; G06T 15/04; G06T 19/20; G06T 2200/04; G06T 2207/20081; G06T 2207/20084; G06V 20/70; H04N 13/279
See application file for complete search history.

(56) References Cited

U.S. PATENT DOCUMENTS

| | | | |
|---|---|---|---|
| 2021/0366128 A1* | 11/2021 | Kim ......................... | G06T 7/194 |
| 2022/0343602 A1* | 10/2022 | Cheng .................... | G06T 17/205 |
| 2023/0290069 A1* | 9/2023 | Su ......................... | G06V 20/653 |
| 2024/0119671 A1* | 4/2024 | Liu ............................ | G06T 7/60 |
| 2024/0223739 A1* | 7/2024 | Xiong ..................... | G06T 7/194 |
| 2024/0312113 A1* | 9/2024 | Panneer ................ | G06T 3/4053 |
| 2025/0069318 A1* | 2/2025 | Maschmeyer ........... | G06T 7/11 |

* cited by examiner

*Primary Examiner* — Maurice L. McDowell, Jr.
(74) *Attorney, Agent, or Firm* — Polsinelli LLP/QUALCOMM Incorporated

(57) ABSTRACT

Techniques and systems are provided for three-dimensional model segmentation. For instances, a process can include: rendering a three-dimensional (3D) model of an object based on a 3D mesh model and a texture of the object; generating a view of the 3D model based on the rendered 3D model; generating a texture space mask based on the texture of the object using a first machine learning (ML) model; generating a labeled mask based on a second ML model; assigning labels to the texture space mask based on the labeled mask to obtain a labeled texture space mask; and generating a 3D mask based on the labeled texture space mask.

20 Claims, 6 Drawing Sheets

300

```
┌─────────────────────────────────────────────────────────────────────┐
│     Render A Three-Dimensional (3D) Model Of An Object Based On A 3D Mesh │
│                    Model And A Texture Of The Object                   │
│                                 302                                   │
└─────────────────────────────────────────────────────────────────────┘
                                  │
                                  ▼
┌─────────────────────────────────────────────────────────────────────┐
│      Generate A View Of The 3D Model Based On The Rendered 3D Model    │
│                                 304                                   │
└─────────────────────────────────────────────────────────────────────┘
                                  │
                                  ▼
┌─────────────────────────────────────────────────────────────────────┐
│   Generate A Texture Space Mask Based On The Texture Of The Object Using A │
│                   First Machine Learning (ML) Model                   │
│                                 306                                   │
└─────────────────────────────────────────────────────────────────────┘
                                  │
                                  ▼
┌─────────────────────────────────────────────────────────────────────┐
│           Generate A Labeled Mask Based On A Second ML Model           │
│                                 308                                   │
└─────────────────────────────────────────────────────────────────────┘
                                  │
                                  ▼
┌─────────────────────────────────────────────────────────────────────┐
│   Assign Labels To The Texture Space Mask Based On The Labeled Mask To │
│                  Obtain A Labeled Texture Space Mask                   │
│                                 310                                   │
└─────────────────────────────────────────────────────────────────────┘
                                  │
                                  ▼
┌─────────────────────────────────────────────────────────────────────┐
│       Generate A 3D Mask Based On The Labeled Texture Space Mask       │
│                                 312                                   │
└─────────────────────────────────────────────────────────────────────┘
```

FIG. 3

TECHNIQUE FOR THREE DIMENSIONAL (3D) HUMAN MODEL PARSING

FIELD

The present disclosure generally relates to systems and techniques for processing three-dimensional (3D) models. For example, aspects of the present disclosure relate to parsing (e.g., segmenting) human 3D models.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame and can be used to facilitate effective operation of various systems. Examples of such applications and systems include augmented reality (AR), robotics, automotive and aviation, three-dimensional scene understanding, object grasping, object tracking, in addition to many other applications and systems.

SUMMARY

Systems and techniques are described herein for parsing (e.g., segmenting) a textured a three-dimensional (3D) model. In one illustrative example, a method for three-dimensional model segmentation is provided. The method includes: rendering a three-dimensional (3D) model of an object based on a 3D mesh model and a texture of the object; generating a view of the 3D model based on the rendered 3D model; generating a texture space mask based on the texture of the object using a first machine learning (ML) model; generating a labeled mask based on a second ML model; assigning labels to the texture space mask based on the labeled mask to obtain a labeled texture space mask; and generating a 3D mask based on the labeled texture space mask.

An apparatus for three-dimensional model segmentation is provided. The apparatus includes at least one memory and at least one processor coupled to the at least one memory. The at least one processor is configured to: render a three-dimensional (3D) model of an object based on a 3D mesh model and a texture of the object; generate a view of the 3D model based on the rendered 3D model; generate a texture space mask based on the texture of the object using a first machine learning (ML) model; generate a labeled mask based on a second ML model; assign labels to the texture space mask based on the labeled mask to obtain a labeled texture space mask; and generate a 3D mask based on the labeled texture space mask.

A non-transitory computer-readable medium having stored thereon instructions is provided. The instructions, when executed by at least one processor, cause the at least one processor to: render a three-dimensional (3D) model of an object based on a 3D mesh model and a texture of the object; generate a view of the 3D model based on the rendered 3D model;

generate a texture space mask based on the texture of the object using a first machine learning (ML) model; generate a labeled mask based on a second ML model; assign labels to the texture space mask based on the labeled mask to obtain a labeled texture space mask; and generate a 3D mask based on the labeled texture space mask.

An apparatus for three-dimensional model segmentation is provided. The apparatus includes: means for rendering a three-dimensional (3D) model of an object based on a 3D mesh model and a texture of the object; means for generating a view of the 3D model based on the rendered 3D model; means for generating a texture space mask based on the texture of the object using a first machine learning (ML) model; means for generating a labeled mask based on a second ML model; means for assigning labels to the texture space mask based on the labeled mask to obtain a labeled texture space mask; and means for generating a 3D mask based on the labeled texture space mask.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

In some aspects, one or more of the apparatuses described herein comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus(es) includes at least one camera for capturing one or more images or video frames. For example, the apparatus(es) can include a camera (e.g., an RGB camera) or multiple cameras for capturing one or more images and/or one or more videos including video frames. In some aspects, the apparatus(es) includes at least one display for displaying one or more images, videos, notifications, or other displayable data. In some aspects, the apparatus(es) includes at least one transmitter configured to transmit one or more video frame and/or syntax data over a transmission medium to at least one device. In some aspects, the at least one processor includes a neural processing unit (NPU), a neural signal processor (NSP), a central processing unit (CPU), a graphics processing unit (GPU), any combination thereof, and/or other processing device or component.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 3 is a flow diagram illustrating a process for 3D human model parsing, in accordance with aspects of the present disclosure.

DETAILED DESCRIPTION

Figure 1:
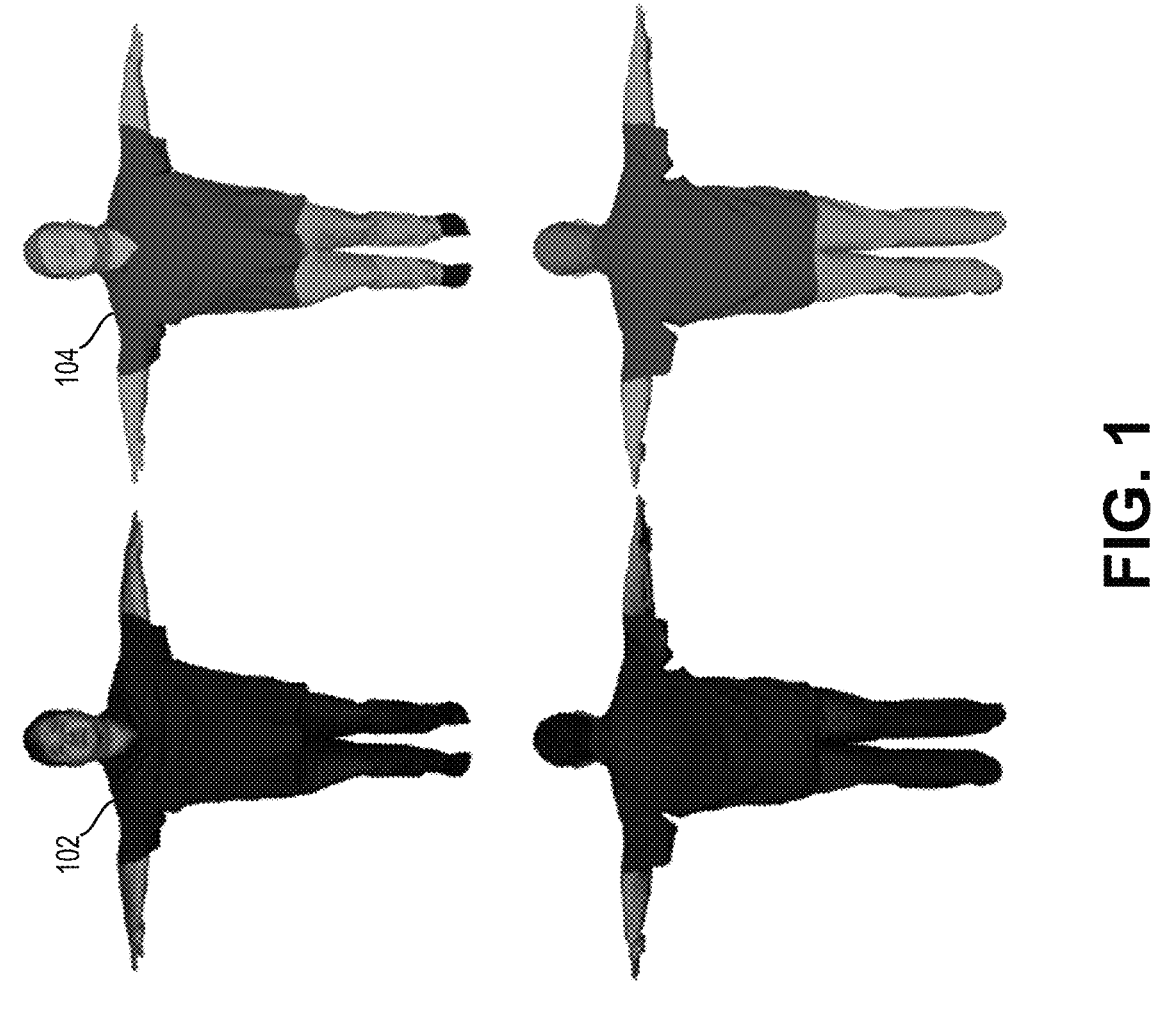
FIG. 1 illustrates an example of 3D human model parsing, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Generation of three-dimensional (3D) models (e.g., 3D meshes) for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images or to display virtual objects on a see-through display (so that the virtual objects appear to be overlaid over the real-world environment). AR applications can align or register the virtual objects to real-world objects (e.g., as observed in the images) in multiple dimensions. For instance, a real-world object that exists in reality can be represented using a model that resembles or is an exact match of the real-world object. In one example, a model of a virtual airplane representing a real airplane sitting on a runway may be presented by the display of an AR device (e.g., AR glasses, AR head-mounted display (HMD), or other device) while the user continues to view his or her natural surroundings through the display. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number of applications take advantage of virtual environments and the flexibility such environments allow for customization and visualization. As an example, users of an XR system may be represented by detailed representations of the users, such as avatars, and the environment may include various other objects that may correspond to objects in the real environment, or objects that only exist in the virtual environment. In some cases, users may be able to customize the virtual environment, as well as objects in the virtual environment, including avatars. As an example, users may be able to customize garments worn by their avatars.

To help facilitate customizing virtual objects, such as avatars, it may be useful to identify parts of the avatar. In some cases, virtual objects may be represented by a 3D model, which may include a 3D mesh along with a texture that may be applied to the 3D mesh. In some cases, this texture may be generated based on captured images of the object (e.g., a person). While segmentation may be performed on 2D versions of the texture and applied to the 3D mesh, such techniques may lack robustness and/or accuracy with respect to label consistency or regions that may experience occlusion. Techniques for 3D model parsing (e.g., segmentation) may be useful.

Systems, apparatuses, processes (also referred to as methods), and computer-readable media (collectively referred to as "systems and techniques") are described herein for segmenting 3D objects in images, such as to generate a 3D model of a human depicted in one or more image. The systems and techniques provide an integrated approach that combines multi-view image space segmentation and texture space segmentation. The segmentation results from multi-view images offer 3D semantic information (e.g., as indicated in a semantic branch), while the texture space segmentation provide accurate region segmentation (e.g., as indicated in a texture or mask branch). The two branches can be merged by associating each segmented region from the texture space segmentation with labels obtained from the semantic branch.

For example, the systems and techniques may obtain a 3D model, such as a 3D mesh. As noted previously, 3D models (e.g., 3D meshes) may be useful for a wide range of industries, including XR, vehicle applications, gaming, animation, and so forth. The 3D mesh may be a representation of a 3D object using vertices and polygons. The systems and techniques may then apply or place a texture on the 3D mesh to generate the 3D object.

In some aspects, the texture may be segmented in a texture branch to generate texture space masks. In some cases, the texture may be segmented using a promptable segmentation ML model. A promptable segmentation ML model may be provided an image and a point and the promptable segmentation ML model may generate a segmentation mask for an object the point is within in the image. As promptable segmentation may not provide reliable/useful labels (e.g., semantic information), a semantic branch may be used to obtain label information. The semantic branch may render the 3D object based on the 3D mesh and texture to obtain views of the 3D object. The views may be segmented using 2D semantic segmentation to generate segmentation masks. The views may also be segmented using promptable segmentation to generate candidate segmentation masks. Masks may be selected from the candidate segmentation masks based on a set of rules to identify candidate masks that are more likely to be valid and labels may be assigned to masks based on a heuristic. The masks may then be back-projected to a 3D space and vertex voting performed to identify labels for vertices of the 3D mesh. A 2D semantically segmented mask based on the labeled vertices may be generated.

In some cases, the 2D semantically segmented mask may be combined with the texture space mask to enhance accuracy of the semantic segmentation. For example, the candidate texture space masks (e.g., candidate texture segmentation masks) may be sorted and labels assigned based on the 2D semantically segmented mask. Unlabeled portions of the resulting mask may be filled and applied to the 3D mesh to generate a 3D mask of the object.

Various aspects of the application will be described with respect to the figures.

FIG. 1 illustrates an example of 3D human model parsing 100, in accordance with aspects of the present disclosure. In some cases, a 3D model 102 of an object, such as a person, may include a mesh model of the object (e.g., a person) and textures that may be aligned onto vertices of the mesh model. In some cases, the mesh model may be a pre-generated mesh model, such as a template mesh model that may be distorted based on the object (e.g., person) being modeled. The textures may be generated based on one or more images of the object (e.g., person). In some cases, to better understand a 3D scene, model clothes, and/or improve animations, it may be useful to segment the 3D model of the object into portions. For example, segmenting a 3D model of a person may be useful for modeling how a garment may drape/fit on the person, which may be used, for example, to generate high fidelity garment surfaces. Segmenting the 3D model of a person (e.g., segmented model 104) may assign labels to individual vertices (and corresponding portion of the texture) of the 3D model indicating what those vertices represent, such as hair, skin, upper clothing, lower clothing, shoes, etc.

Figure 2:
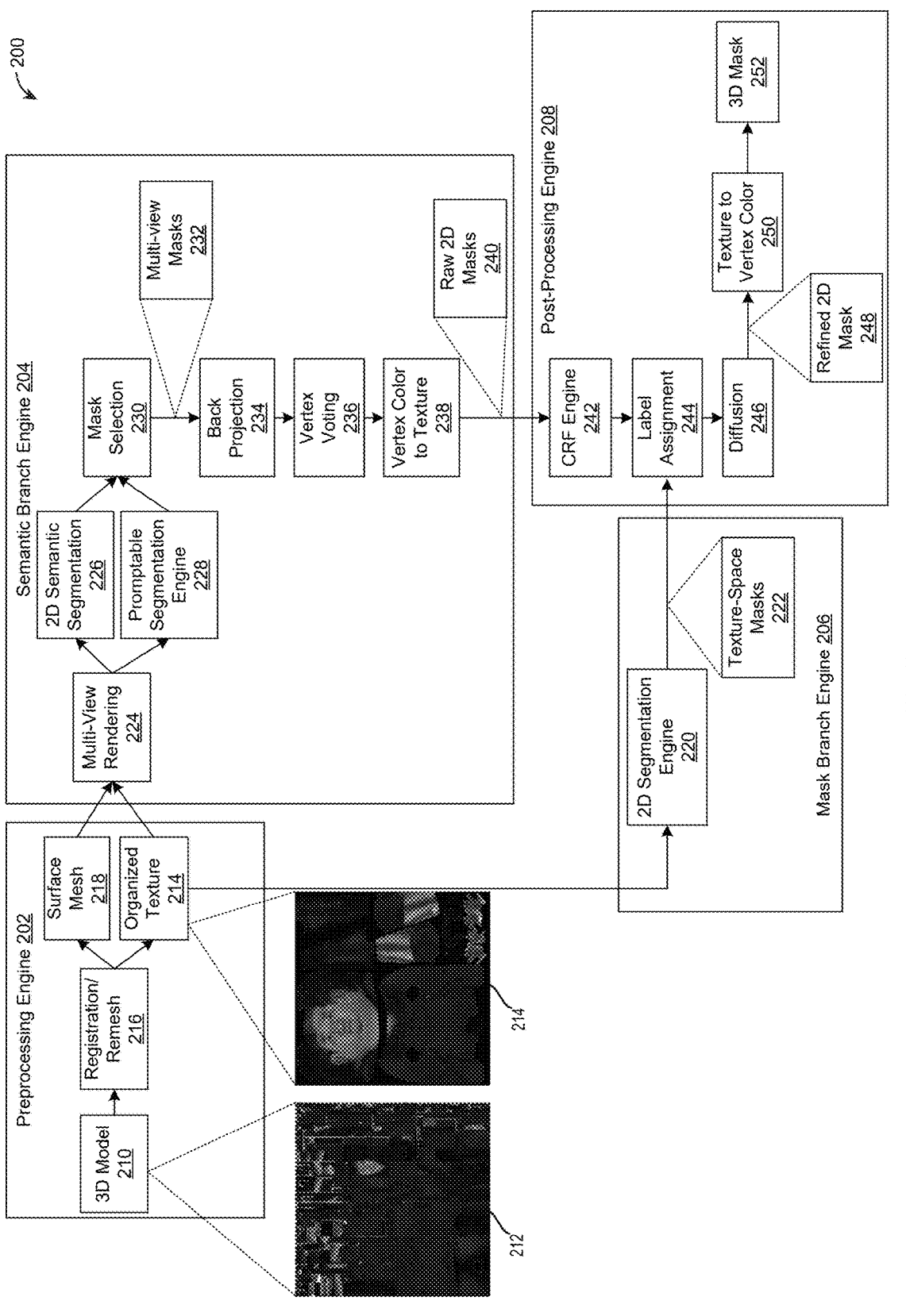
FIG. 2 is a block diagram illustrating a technique for 3D human model parsing, in accordance with aspects of the present disclosure.

FIG. 2 is a block diagram illustrating a technique for 3D human model parsing 200, in accordance with aspects of the present disclosure. In some cases, the technique for 3D human model parsing may include a preprocessing engine 202, a semantic branch engine 204, a mask branch engine 206, and a postprocessing engine 208. As a part of the preprocessing engine 202, a 3D model 210 of an object, such as a person, may be received. The 3D model 210 may include a 3D mesh of the object along with a fragmented texture 212. In some cases, a texture for the 3D mesh may be generated based on a multi-view image where multiple images of the object from multiple cameras (and angles) may be merged into a single image, such as fragmented texture 212. As different portions of the object may be scattered in different places of the fragmented texture 212, processing the fragmented texture 212 may be inconvenient. In some cases, it may be useful to transform the fragmented texture 212 to a more organized texture 214 representation using a registration/remesh engine 216. The organized texture 214 (e.g., normalized texture) may be oriented in a UV space where U and V denote the axes for the UV space and vertices of the 3D model 210 may be mapped to particular locations of the UV space. The registration/remesh engine 216 may align the fragmented texture 212 to the UV space to obtain the organized texture 214 by aligning the input 3D mesh with a neutral model of the object (e.g., to a standardized parametric human body model) and converting the mapped texture of the input 3D mesh (e.g., textures mapped vertices of the input 3D mesh) to the UV space. The 3D mesh aligned with the neutral model may be output as the surface mesh 218. In cases where the 3D model 210 includes an organized texture 214 and surface mesh 218 (e.g., already aligned with a standardized parametric human body model), the preprocessing engine 202 may be skipped.

In some cases, the organized texture 214 may be input to a 2D segmentation engine 220 of the mask branch engine 206. The 2D segmentation engine 220 may segment the organized texture 214 to generate a segmentation mask for one or more parts of the object in the organized texture 214. In some cases, the 2D segmentation engine 220 can generate or assign labels for the one or more parts of the object. In some cases, the 2D segmentation engine 220 may be a promptable segmentation machine learning (ML) model. The promptable segmentation ML model may be transformer network based ML model. In some cases, the promptable segmentation ML model may be prompted based on a prompt point of the organized texture 214. The promptable segmentation ML model may then generate a candidate texture segmentation mask for a part (e.g., portion) of the object corresponding to the prompt point. Random sampling may be used to generate a set of prompt points of the organized texture 214 and produce a set of candidate texture segmentation masks. Some candidate texture segmentation masks may be a few pixels of noise (e.g., where a prompt point corresponds to an empty space), and these candidate texture segmentation masks may be discarded. Other candidate texture segmentation masks may correspond to various body parts and these candidate texture segmentation masks may be retained. In some cases, the candidate texture segmentation masks may include combined masks, such as where an upper body mask is combined with a head mask. Such combined masks may be addressed as a part of a postprocessing process by the postprocessing engine 208. The retained candidate texture segmentation masks may be output as texture-space masks 222 to a label assignment engine 244 of the postprocessing engine 208. Of note, the texture-space masks 222 may not include accurate semantic information (e.g., labels) indicating, for example, what the segmented portions correlate with. For example, the segmentation masks may segment out different parts of the object without indicating what those different parts are. In some cases, the semantic information may be provided by the semantic branch engine 204.

In some cases, the surface mesh 218 and organized texture 214 may be input to a multi-view rendering engine 224 of the semantic branch engine 204. The multi-view rendering engine 224 may render a 3D model based on the surface mesh 218 and organized texture 214.

For example, the multi-view rendering engine 224 may overlay the organized texture 214 on the surface mesh 218 based on the mapping between the organized texture 214 to vertices of the surface mesh 218. Based on the rendered 3D model of the object, a set of images of the 3D model from different angles may be generated. For example, 36 images of the 3D model may be generated from 36 different camera perspectives, including 12 angles with 3 elevations, directed towards the object's center. The set of images of the 3D model may be input to a 2D sematic segmentation engine 226 and a promptable segmentation engine 228.

The 2D sematic segmentation engine 226 may generate a set of 2D semantic segmentation masks labeling, for example, parts of the object (e.g., semantic information). In some cases, the 2D semantic segmentation engine 226 may use a traditional 2D semantic segmentation technique, such as a CNN/DL based architecture like YOLO, CLIP, etc., trained to recognize categories of parts. For example, traditional 2D semantic segmentation techniques generally perform well with parts like hair, skin, etc., but they may struggle when it comes to labeling parts like garments due to the considerable variation in clothing styles and longtail distribution of garment shapes. In some cases, the 2D semantic segmentation engine 226 may be used to extract a part-specific mask. In one illustrative example, the part-specific mask can include a garment mask, for example, encompassing upper clothing, lower clothing, and shoes (in some cases along with other parts such as hair skin, ears, etc.). The set of 2D semantic segmentation masks, including the part-specific mask (e.g., a garment mask), may be input to a mask selection engine 230.

In some cases, the promptable segmentation engine 228 may then be used to augment the 2D semantic segmentation engine 226. For instance, the set of images of the 3D model input to the promptable segmentation engine 228 may be used to generate a set of 2D segmentation masks that may be cross-referenced with the 2D semantic segmentation masks, for example, to improve the ability of the 2D semantic segmentation masks from the 2D semantic segmentation engine 226 to accurately label one or more parts of the object (e.g., garments of a human). As indicated above, the promptable segmentation engine 228 may be prompted with one or more prompt points for an image to generate candidate segmentation masks based on the prompt points. For example, a random sample of prompt points may be generated for images of the set of images input to the promptable segmentation engine 228 to generate a set of candidate segmentation masks. The set of candidate segmentation masks may be input to the mask selection engine 230. In some cases, the promptable segmentation engine 228 may be based on a same ML model as the 2D segmentation engine 220 (e.g., including the promptable segmentation ML model).

The mask selection engine 230 may select masks from the set of candidate segmentation masks based on a set of rules. For example, the mask selection engine 230 may select masks which 1. are larger than a certain size threshold, 2. fall within (e.g., fits within) the part-specific mask, such as a garment mask (e.g., from the 2D semantic segmentation engine 226), and 3. where there is mask overlap (e.g., mask A overlaps with mask B), the overlapping mask (e.g., mask A) is excluded from consideration, and a residual mask (e.g., mask C resulting from extracting mask B from mask A) may be added to the set of candidate segmentation masks.

As indicated above, masks from the set of candidate segmentation masks may be unlabeled or provide inaccurate labels. To generate labels, the candidate segmentation masks for the set of images remaining after the set of rules are applied may be organized based on a heuristic and assigned a set of labels. For example, the candidate segmentation masks may be arranged according to their vertical positions (e.g., based on the image coordinates, based on UV coordinates, etc.). In some cases, a highest-positioned (e.g., highest vertical position) mask may be designated as an upper clothing mask, while the second-highest positioned mask may be designated as a lower clothing mask. Iterating through all candidate masks (relaxing the mask size criteria) may be used to gather all masks having a height lower than the bottom clothing mask, and the gathered masks may be assembled into a single mask for shoes. In some cases, the selection may be performed per image (e.g., for the different perspectives of the 3D model) and added to the set of 2D semantic segmentation masks for output as multi-view masks 232.

The multi-view masks 232 may be passed to a back projection engine 234, which may back project the multi-view masks 232 into a 3D space (e.g., based on the mapping between the textures to vertices of the mesh). The back projected multi-view masks may be passed to a vertex voting engine 236. As there may be multiple views for vertices of the mesh, per-vertex voting may be used to determine a best label (e.g., from the multiple masks) for each vertex. The labeled mesh may be passed to the vertex color to texture engine 238, which may use the labeled vertex to generate a labeled raw 2D mask 240 in the UV space (e.g., corresponding to the organized texture 214). The labeled raw 2D mask 240 may be passed to the conditional random fields (CRF) engine 242 of the post-processing engine 208.

The CRF engine 242 may enhance an accuracy of the semantic segmentation within the UV space using the labeled raw 2D mask 240. The CRF engine 242 may use traditional techniques to refine the labeled raw 2D mask 240. This refined 2D mask may be passed to the label assignment engine 244. In some cases, the labeled raw 2D mask 240 and texture-space masks 222 may be used to enhance an accuracy of the semantic segmentation within the UV space. For example, the label assignment engine 244 may sort the multiple candidate texture segmentation masks based on an area labeled by the segmentation masks from small to large. For each candidate texture segmentation mask, a ratio of unlabeled pixels to total pixels may be determined. If the ratio exceeds a predefined threshold, label assignment may be performed for the candidate texture segmentation mask. If the ratio does not exceed a predefined threshold, then the candidate texture segmentation mask may be discarded. In some cases, such as for iterating smaller masks to larger masks, previously assigned values for unlabeled portions may be retained. The label assignment engine 244 may also label unassigned pixels within a segmentation mask based on a most frequently occurring labels of the segmentation mask for a same region in the raw 2D mask 240. The labeled texture space masks may be passed to a diffusion engine 246.

The diffusion engine 246 may fill in gaps between the texture space masks and boundaries of the image to generate a refined 2D mask 248. The refined 2D mask 248 may be passed to a texture to vertex color engine 250 which may generate a 3D mask 252 based on the mapping of the refined 2D mask 248 in UV space to vertices of the mesh, for example, as per-vertex annotations. The 3D mask 252 may then be output for use by downstream applications.

FIG. 3 is a flow diagram illustrating a process 300 for 3D human model parsing, in accordance with aspects of the present disclosure. The process 300 may be performed by a computing device (or apparatus) or a component (e.g., a chipset, codec, processor 610 of FIG. 6, etc.) of the computing device. The computing device may be a mobile device (e.g., a mobile phone, and the like), a network-connected wearable such as a watch, an extended reality (XR) device such as a virtual reality (VR) device or augmented reality (AR) device, a vehicle or component or system of a vehicle, or other type of computing device (e.g., computing system 600 of FIG. 6). The operations of the process 300 may be implemented as software components that are executed and run on one or more processors (e.g., processor 610 of FIG. 6, and the like). In some cases, the operations of the process 300 can be implemented by a system having the computing system 600 of FIG. 6.

At block 302, the computing device (or component thereof) may render (e.g., using the multi-view rendering engine 224 of FIG. 2) a three-dimensional (3D) model of an object based on a 3D mesh model (e.g., surface mesh 218 of FIG. 2) and a texture (e.g., organized texture 214 of FIG. 2) of the object. In some cases, the computing device (or component thereof) may receive a 3D model (e.g., 3D model 210 of FIG. 2). For example, the 3D model can include a 3D mesh and a fragmented texture. The computing device (or component thereof) may align the 3D mesh with a neutral model and convert the fragmented texture to the texture based on the aligned 3D mesh. In some cases, the object is a person, a vehicle, or other type of object.

At block 304, the computing device (or component thereof) may generate (e.g., using the multi-view rendering engine 224 of FIG. 2) a view of the 3D model based on the rendered 3D model. For example, based on the rendered 3D model of the object, the computing device (or component thereof) may generate images of the 3D model from different angles. In some cases, the computing device (or component thereof) may generate the view of the 3D model based on the rendered 3D model by generating multiple different views of the 3D model. In some examples, to generate the semantic segmentation mask for the view, the computing device (or component thereof) may generate a respective semantic segmentation mask for each view of the multiple different views and generate a respective segmentation mask for each view of the multiple different views.

At block 306, the computing device (or component thereof) may generate a texture space mask (e.g., texture space mask 222 of FIG. 2) based on the texture of the object using a first machine learning (ML) model. In some cases, the first ML model includes a promptable segmentation ML model configured to generate a segmentation mask for the view of the 3D model based on one or more prompt points.

At block 308, the computing device (or component thereof) may generate a labeled mask (e.g., raw 2D masks of FIG. 2) based on a second ML model. For example, the second ML model may have a CNN/DL based architecture like YOLO, CLIP, etc., trained to recognize categories of parts. In some cases, the second ML model includes a semantic segmentation ML model (e.g., 2D sematic segmentation engine 226 of FIG. 2). In some aspects, the computing device (or component thereof) may generate the labeled mask further based on the promptable segmentation ML model (e.g., promptable segmentation engine 228 of FIG. 2). In some examples, to generate the labeled mask, the computing device (or component thereof) may generate a semantic segmentation mask for the view using the semantic segmentation ML model and may generate a segmentation mask for the view using the promptable segmentation ML model. The computing device (or component thereof) may back project (e.g., by the back projection engine 234 of FIG. 2) the segmentation mask and the semantic segmentation mask to a 3D space. The computing device (or component thereof) may perform per-vertex voting (e.g., by the vertex voting engine 236 of FIG. 2) to assign labels from the segmentation mask to vertices of the 3D mesh model to obtain a labeled mesh. The computing device (or component thereof) may generate the labeled mask based on the labeled mesh.

In some cases, the computing device (or component thereof) may generate the segmentation mask for the view using the promptable segmentation ML model by generating a set of prompt points for the view and prompting the promptable segmentation ML model using the generated set of prompt points. In some examples, the set of prompt points include a set of random prompt points. In some cases, the computing device (or component thereof) may receive a set of candidate segmentation masks from the promptable segmentation ML model based on the generated set of prompt points and may select the segmentation mask from the set of candidate segmentation masks based on a set of rules. In some examples, the set of rules causes the segmentation mask to be selected based on a threshold size and/or a determination that the segmentation mask fits within the semantic segmentation mask. In some cases, the computing device (or component thereof) may label one or more parts of an object based on a heuristic. In some examples, the heuristic comprises a vertical position of the one or more parts of the object in the segmentation mask.

At block 310, the computing device (or component thereof) may assign labels (e.g., by the label assignment engine 244 of FIG. 2) to the texture space mask based on the labeled mask to obtain a labeled texture space mask.

At block 312, the computing device (or component thereof) may generate a 3D mask (e.g., 3D mask 252 of FIG. 2) based on the labeled texture space mask.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the process 300. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 300 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300, and/or other processes described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 4:
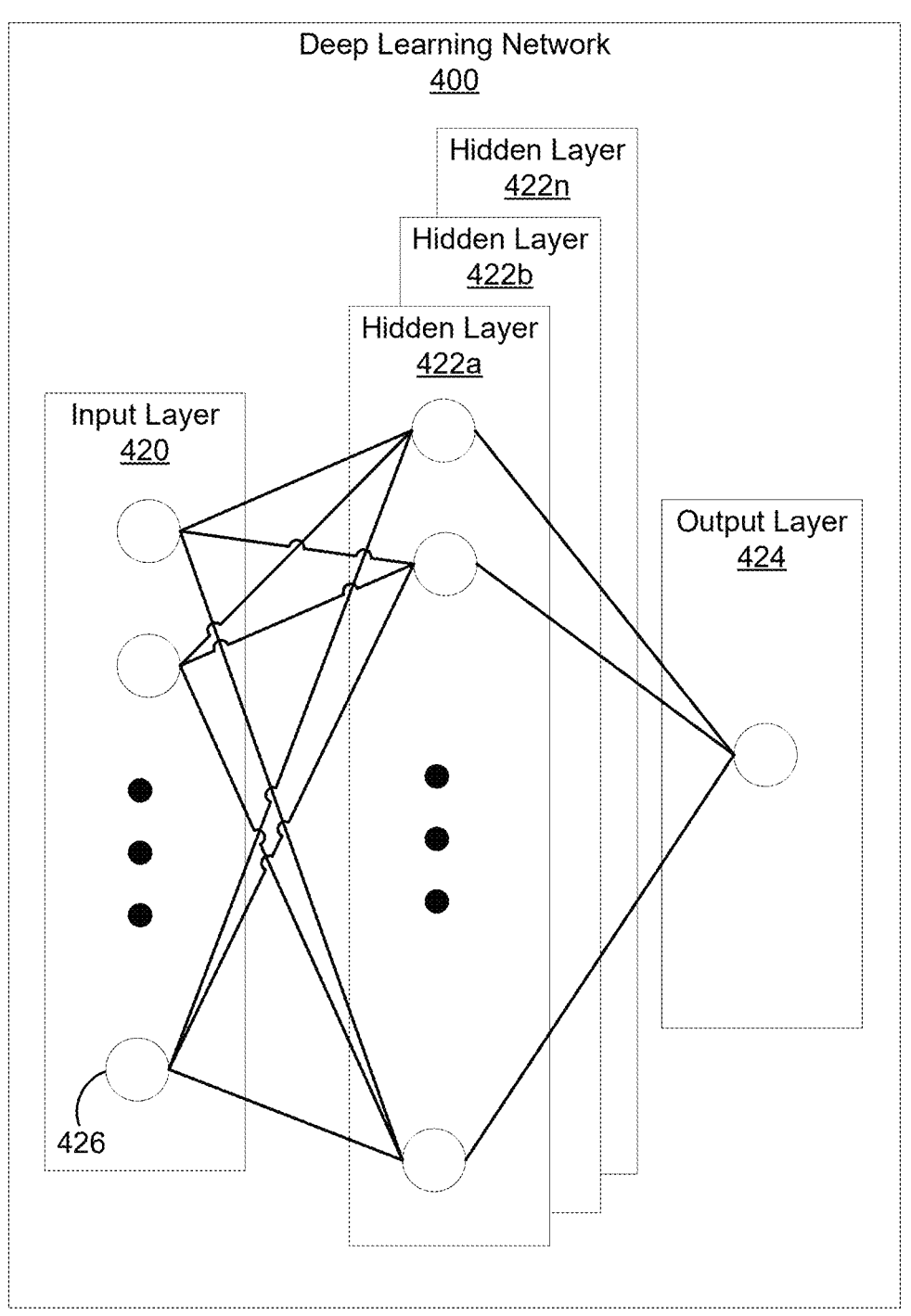
FIG. 4 is an illustrative example of a deep learning neural network that can be used by a 3D model training system.

FIG. 4 is an illustrative example of a deep learning neural network 400 that can be used by a system for 3D model segmentation. An input layer 420 includes input data. In one illustrative example, the input layer 420 can include data representing the pixels of an input video frame. The neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. The neural network 400 further includes an output layer 424 that provides an output resulting from the processing performed by the hidden layers 422a, 422b, through 422n. In one illustrative example, the output layer 424 can provide a classification for an object in an input video frame. The classification can include a class identifying the type of object (e.g., a person, a dog, a cat, or other object). Each layer may include a set of artificial neurons (e.g., nodes) that may process input data and provide output data. The structure and training of the nodes in the various layers may be tailored to specific requirements.

The neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the hidden layers 422a, 422b, through 422n can transform the information of each input node by applying activation functions to the information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 424, at which an output is provided. In some cases, while nodes (e.g., node 426) in the neural network 400 are shown as having multiple output lines, a node has a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 424. In an example in which the neural network 400 is used to identify objects in images, the neural network 400 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 400 can adjust the weights of the nodes using a training process called back-propagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 400 is trained well enough so that the weights of the layers are accurately tuned.

For the example of identifying objects in images, the forward pass can include passing a training image through the neural network 400. The weights are initially randomized before the neural network 400 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 400, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 400 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 400 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, wi denotes the initial weight, and η denotes a learning rate. The learning rate can be set to any suitable value, with a high learning rate including larger weight updates and a lower value indicating smaller weight updates.

The neural network 400 can include any suitable deep network. One example includes a convolutional neural network (CNN), which includes an input layer and an output layer, with multiple hidden layers between the input and out layers. An example of a CNN is described below with respect to FIG. 4. The hidden layers of a CNN include a series of convolutional, nonlinear, pooling (for downsampling), and fully connected layers. The neural network 400 can include any other deep network other than a CNN, such as an autoencoder, a deep belief nets (DBNs), a Recurrent Neural Networks (RNNs), among others. The neural network 400 illustrates a fully connected structure, and it should be understood that other structures may be used as well. For example, in a feedforward neural network structure, each node in a layer may receives information from the previous layer (such as from one or more nodes in a previous layer) and may produces information for the next layer. In some CNN structures, some layers may be organized into filters that extract features from data, such as the training data or the input data. In a recurrent neural network structure, some layers may have connections that allow for processing of data across time, such as for processing information having a temporal structure, such as time series data forecasting. In an autoencoder neural network structure, compact representations of data may be processed and the model trained to predict or potentially reconstruct original data from a reduced set of features. An autoencoder neural network structure may be useful for tasks related to dimensionality reduction and data compression.

A generative adversarial neural network structure may include a generator neural network and a discriminator neural network that are trained to compete with each other. Generative-adversarial networks (GANs) are ANN structures that may be useful for tasks relating to generating synthetic data or improving the performance of other models.

A transformer neural network structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute weighted sums of input features based on a similarity between different elements of the input sequence. A transformer neural network structure may include a series of feedforward neural network layers whose configurations may change in response to identifying non-linear relationships between the input and output sequences, which may also be referred to as a process of "learning" by the neural network layers. The output of a transformer neural network structure may be obtained by applying a linear transformation to the output of a final attention layer. A transformer neural network structure may be of particular use for tasks that involve sequence modeling, or other like processing.

Figure 5:
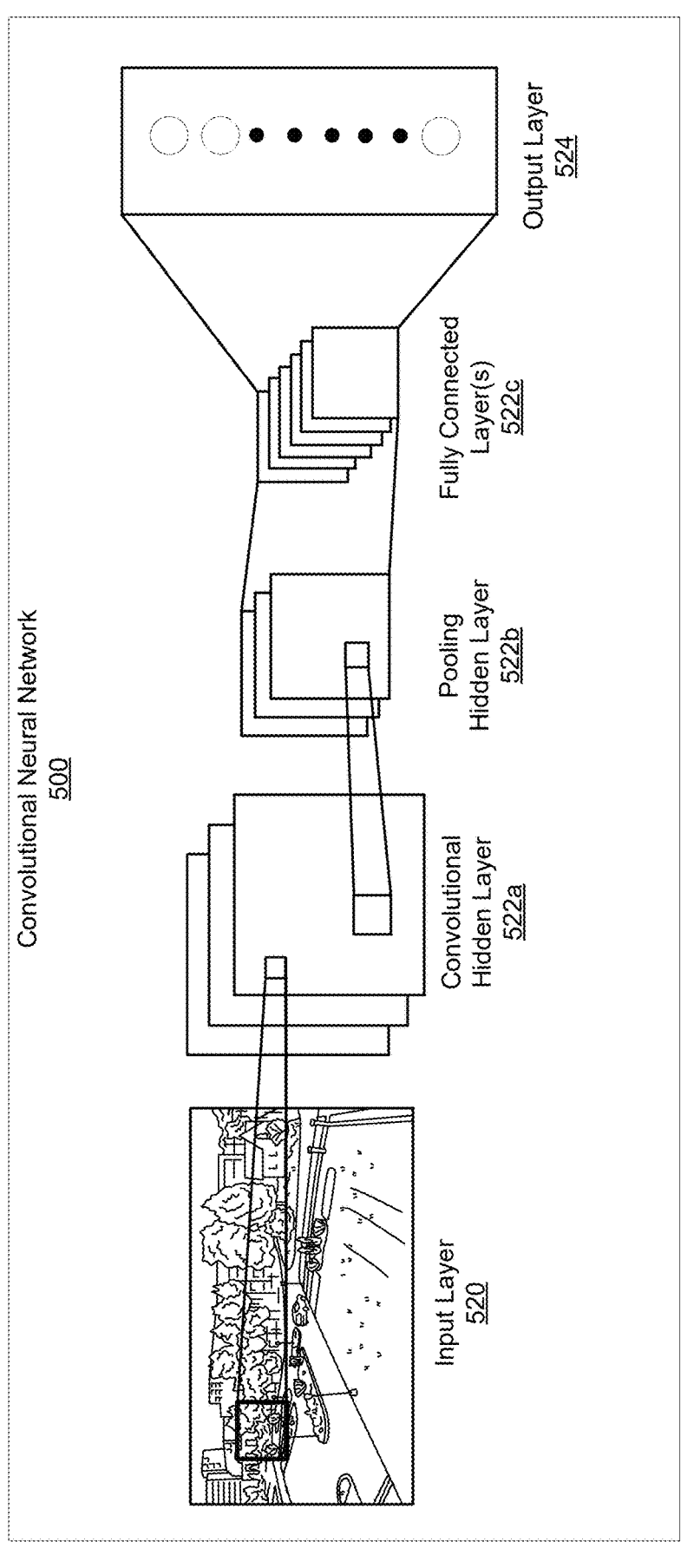
FIG. 5 is an illustrative example of a convolutional neural network (CNN).

FIG. 5 is an illustrative example of a convolutional neural network (CNN 500). The input layer 520 of the CNN 500 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 522a, an optional non-linear activation layer, a pooling hidden layer 522b, and fully connected hidden layers 522c to get an output at the output layer 524. While only one of each hidden layer is shown in FIG. 5, one of ordinary skill will appreciate that multiple convolutional hidden layers, non-linear layers, pooling hidden layers, and/or fully connected layers can be included in the CNN 500. As previously described, the output can indicate a single class of an object or can include a probability of classes that best describe the object in the image.

The first layer of the CNN 500 is the convolutional hidden layer 522a. The convolutional hidden layer 522a analyzes the image data of the input layer 520. Each node of the convolutional hidden layer 522a is connected to a region of nodes (pixels) of the input image called a receptive field. The convolutional hidden layer 522a can be considered as one or more filters (each filter corresponding to a different activation or feature map), with each convolutional iteration of a filter being a node or neuron of the convolutional hidden layer 522a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 522a. Each connection between a node and a receptive field for that node learns a weight and, in some cases, an overall bias such that each node learns to analyze its particular local receptive field in the input image. Each node of the hidden layer 522a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 522a is due to each node of the convolutional layer being applied to its corresponding receptive field. For example, a filter of the convolutional hidden layer 522a can begin in the top-left corner of the input image array and can convolve around the input image. As noted above, each convolutional iteration of the filter can be considered a node or neuron of the convolutional hidden layer 522a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 522a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 522a.

The mapping from the input layer to the convolutional hidden layer 522a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 522a can include several activation maps in order to identify multiple features in an image. The example shown in FIG. 5 includes three activation maps. Using three activation maps, the convolutional hidden layer 522a can detect three different kinds of features, with each feature being detectable across the entire image.

In some examples, a non-linear hidden layer can be applied after the convolutional hidden layer 522a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 500 without affecting the receptive fields of the convolutional hidden layer 522a.

The pooling hidden layer 522b can be applied after the convolutional hidden layer 522a (and after the non-linear hidden layer when used). The pooling hidden layer 522b is used to simplify the information in the output from the convolutional hidden layer 522a. For example, the pooling hidden layer 522b can take each activation map output from the convolutional hidden layer 522a and generates a condensed activation map (or feature map) using a pooling function. Max-pooling is one example of a function performed by a pooling hidden layer. Other forms of pooling functions be used by the pooling hidden layer 522a, such as average pooling, L2-norm pooling, or other suitable pooling functions. A pooling function (e.g., a max-pooling filter, an L2-norm filter, or other suitable pooling filter) is applied to each activation map included in the convolutional hidden layer 522a. In the example shown in FIG. 5, three pooling filters are used for the three activation maps in the convolutional hidden layer 522a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 522a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 522a having a dimension of 24×24 nodes, the output from the pooling hidden layer 522b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 500.

The final layer of connections in the network is a fully-connected layer that connects every node from the pooling hidden layer 522b to every one of the output nodes in the output layer 524. Using the example above, the input layer includes 28×28 nodes encoding the pixel intensities of the input image, the convolutional hidden layer 522a includes 3×24×24 hidden feature nodes based on application of a 5×5 local receptive field (for the filters) to three activation maps, and the pooling layer 522b includes a layer of 3×12×12 hidden feature nodes based on application of max-pooling filter to 2×2 regions across each of the three feature maps. Extending this example, the output layer 524 can include ten output nodes. In such an example, every node of the 3×12×12 pooling hidden layer 522b is connected to every node of the output layer 524.

The fully connected layer 522c can obtain the output of the previous pooling layer 522b (which should represent the activation maps of high-level features) and determines the features that most correlate to a particular class. For example, the fully connected layer 522c layer can determine the high-level features that most strongly correlate to a particular class, and can include weights (nodes) for the high-level features. A product can be computed between the weights of the fully connected layer 522c and the pooling hidden layer 522b to obtain probabilities for the different classes. For example, if the CNN 500 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 524 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 6:
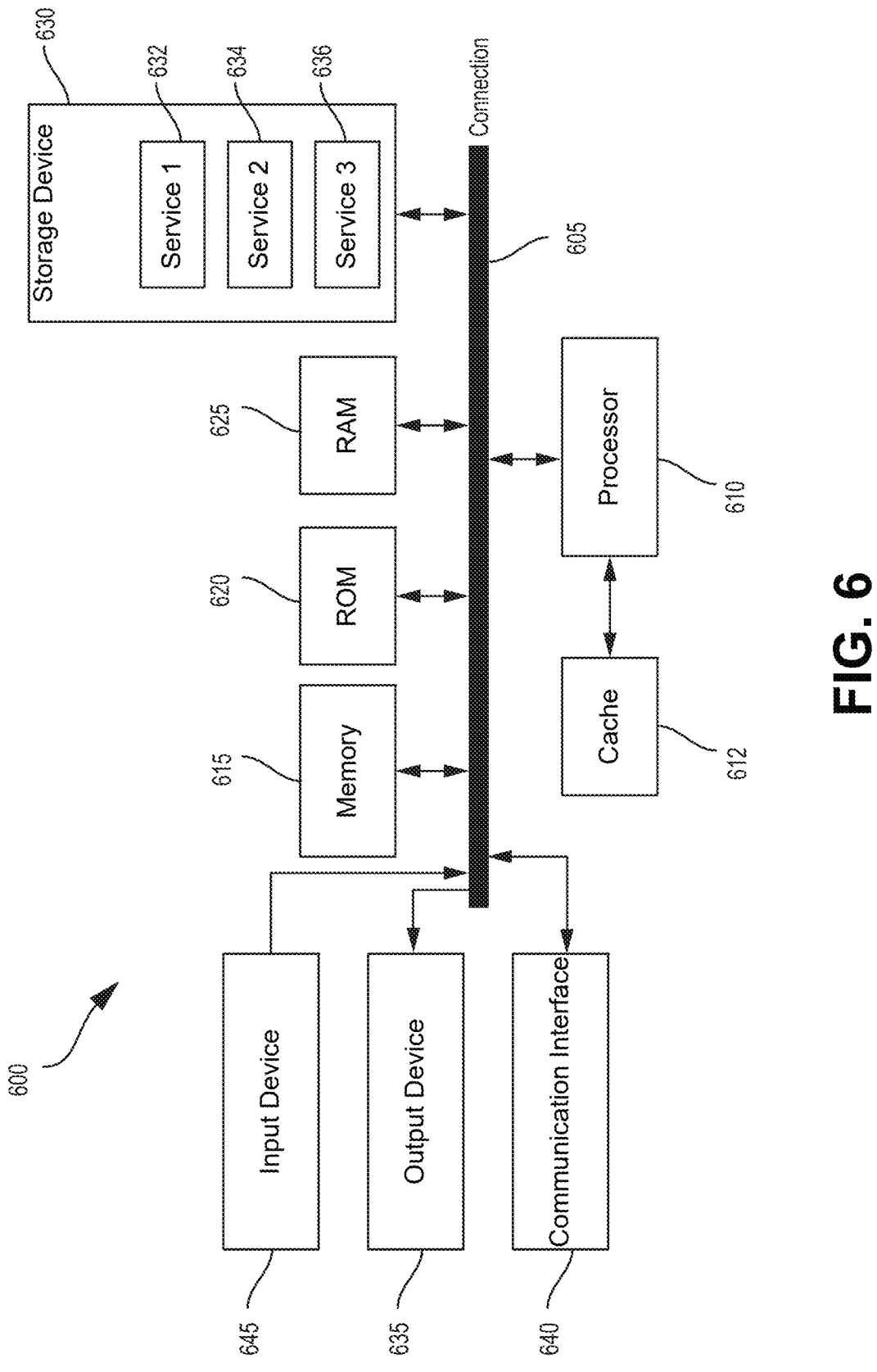
FIG. 6 is a diagram illustrating an example of a system for implementing certain aspects of the present technology.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some aspects, computing system 600 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some aspects, a hardware service that performs a particular function can include the software component stored in a computer-readable medium in connection with the necessary hardware components, such as processor 610, connection 605, output device 635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rack-mount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the present disclosure include:

Aspect 1. A method for three-dimensional model segmentation, the method comprising: rendering a three-dimensional (3D) model of an object based on a 3D mesh model and a texture of the object; generating a view of the 3D model based on the rendered 3D model; generating a texture space mask based on the texture of the object using a first machine learning (ML) model; generating a labeled mask based on a second ML model; assigning labels to the texture space mask based on the labeled mask to obtain a labeled texture space mask; and generating a 3D mask based on the labeled texture space mask.

Aspect 2. The method of Aspect 1, wherein the first ML model comprises a promptable segmentation ML model configured to generate a segmentation mask for the view of the 3D model based on one or more prompt points.

Aspect 3. The method of Aspect 2, wherein the second ML model comprises semantic segmentation ML model, and wherein the labeled mask is further generated based on the promptable segmentation ML model.

Aspect 4. The method of Aspect 3, wherein generating the labeled mask comprises: generating a semantic segmentation mask for the view using the semantic segmentation ML model; generating a segmentation mask for the view using the promptable segmentation ML model; back projecting the segmentation mask and the semantic segmentation mask to a 3D space; performing per-vertex voting to assign labels from the segmentation mask to vertices of the 3D mesh model to obtain a labeled mesh; and generating the labeled mask based on the labeled mesh.

Aspect 5. The method of Aspect 4, wherein generating the segmentation mask for the view using the promptable segmentation ML model comprises: generating a set of prompt points for the view; and prompting the promptable segmentation ML model using the generated set of prompt points.

Aspect 6. The method of Aspect 5, wherein the set of prompt points include a set of random prompt points.

Aspect 7. The method of any of Aspects 5-6, further comprising: receiving a set of candidate segmentation masks from the promptable segmentation ML model based on the generated set of prompt points; and selecting the segmentation mask from the set of candidate segmentation masks based on a set of rules.

Aspect 8. The method of Aspect 7, wherein the set of rules causes the segmentation mask to be selected based on at least one of: a threshold size; or a determination that the segmentation mask fits within the semantic segmentation mask.

Aspect 9. The method of any of Aspects 4-8, wherein: generating the view of the 3D model based on the rendered 3D model comprises generating multiple different views of the 3D model; generating the semantic segmentation mask for the view comprises generating a respective semantic segmentation mask for each view of the multiple different views; and generating the segmentation mask for the view comprises generating a respective segmentation mask for each view of the multiple different views.

Aspect 10. The method of any of Aspects 2-9, further comprising labeling one or more parts of an object based on a heuristic.

Aspect 11. The method of Aspect 10, wherein the heuristic comprises a vertical position of the one or more parts of the object in the segmentation mask.

Aspect 12. The method of any of Aspects 1-11, further comprising: receiving a 3D model, the 3D model including a 3D mesh and a fragmented texture; aligning the 3D mesh with a neutral model; and converting the fragmented texture to the texture based on the aligned 3D mesh.

Aspect 13. The method of any of Aspects 1-12, wherein the object is a person.

Aspect 14. An apparatus for three-dimensional model segmentation, the apparatus comprising: at least one memory; and at least one processor coupled to the at least one memory, the at least one processor being configured to: render a three-dimensional (3D) model of an object based on a 3D mesh model and a texture of the object; generate a view of the 3D model based on the rendered 3D model; generate a texture space mask based on the texture of the object using a first machine learning (ML) model; generate a labeled mask based on a second ML model; assign labels to the texture space mask based on the labeled mask to obtain a labeled texture space mask; and generate a 3D mask based on the labeled texture space mask.

Aspect 15. The apparatus of Aspect 14, wherein the first ML model comprises a promptable segmentation ML model configured to generate a segmentation mask for the view of the 3D model based on one or more prompt points.

Aspect 16. The apparatus of Aspect 15, wherein the second ML model comprises semantic segmentation ML model, and wherein the labeled mask is further generated based on the promptable segmentation ML model.

Aspect 17. The apparatus of Aspect 16, wherein, to generate the labeled mask, the at least one processor is configured to: generate a semantic segmentation mask for the view using the semantic segmentation ML model; generate a segmentation mask for the view using the promptable segmentation ML model; back project the segmentation mask and the semantic segmentation mask to a 3D space; perform per-vertex voting to assign labels from the segmentation mask to vertices of the 3D mesh model to obtain a labeled mesh; and generate the labeled mask based on the labeled mesh.

Aspect 18. The apparatus of Aspect 17, wherein, to generate the segmentation mask for the view using the promptable segmentation ML model, the at least one processor is configured to: generate a set of prompt points for the view; and prompt the promptable segmentation ML model using the generated set of prompt points.

Aspect 19. The apparatus of Aspect 18, wherein the set of prompt points include a set of random prompt points.

Aspect 20. The apparatus of any of Aspects 18-19, wherein the at least one processor is further configured to: receive a set of candidate segmentation masks from the promptable segmentation ML model based on the generated set of prompt points; and select the segmentation mask from the set of candidate segmentation masks based on a set of rules.

Aspect 21. The apparatus of Aspect 20, wherein the set of rules causes the segmentation mask to be selected based on at least one of: a threshold size; or a determination that the segmentation mask fits within the semantic segmentation mask.

Aspect 22. The apparatus of any of Aspects 17-21, wherein, to generate the view of the 3D model based on the rendered 3D model, the at least one processor is configured to generate multiple different views of the 3D model; and wherein, to generate the semantic segmentation mask for the view, the at least one processor is configured to: generate a respective semantic segmentation mask for each view of the multiple different views; and generate a respective segmentation mask for each view of the multiple different views.

Aspect 23. The apparatus of any of Aspects 15-22, wherein the at least one processor is configured to label one or more parts of an object based on a heuristic.

Aspect 24. The apparatus of Aspect 23, wherein the heuristic comprises a vertical position of the one or more parts of the object in the segmentation mask.

Aspect 25. The apparatus of any of Aspects 14-24, wherein the at least one processor is further configured to: receive a 3D model, the 3D model including a 3D mesh and a fragmented texture; align the 3D mesh with a neutral model; and convert the fragmented texture to the texture based on the aligned 3D mesh.

Aspect 26. The apparatus of any of Aspects 14-25, wherein the object is a person.

Aspect 27. A non-transitory computer-readable medium having stored thereon instructions that, when executed by at least one processor, cause the at least one processor to: render a three-dimensional (3D) model of an object based on a 3D mesh model and a texture of the object; generate a view of the 3D model based on the rendered 3D model; generate a texture space mask based on the texture of the object using a first machine learning (ML) model; generate a labeled mask based on a second ML model; assign labels to the texture space mask based on the labeled mask to obtain a labeled texture space mask; and generate a 3D mask based on the labeled texture space mask.

Aspect 28. The non-transitory computer-readable medium of Aspect 27, wherein the first ML model comprises a promptable segmentation ML model configured to generate a segmentation mask for the view of the 3D model based on one or more prompt points.

Aspect 29. The non-transitory computer-readable medium of Aspect 28, wherein the second ML model comprises semantic segmentation ML model, and wherein the labeled mask is further generated based on the promptable segmentation ML model.

Aspect 30. The non-transitory computer-readable medium of Aspect 29, wherein, to generate the labeled mask, the instructions cause the at least one processor to: generate a semantic segmentation mask for the view using the semantic segmentation ML model; generate a segmentation mask for the view using the promptable segmentation ML model; back project the segmentation mask and the semantic segmentation mask to a 3D space;

perform per-vertex voting to assign labels from the segmentation mask to vertices of the 3D mesh model to obtain a labeled mesh; and generate the labeled mask based on the labeled mesh.

Aspect 31. A non-transitory computer-readable medium having stored thereon instructions that, when executed by at least one processor, cause the at least one processor to perform one or more operations according to any of Aspects 1-13.

Aspect 32. An apparatus for processing video data, comprising one or more means for performing one or more of operations according to any of Aspects 1-13.

What is claimed is:

1. An apparatus for three-dimensional model segmentation, the apparatus comprising:
   at least one memory; and
   at least one processor coupled to the at least one memory, the at least one processor being configured to:
      render a three-dimensional (3D) model of an object based on a 3D mesh model and a texture of the object;
      generate a view of the 3D model based on the rendered 3D model;
      generate a texture space mask based on the texture of the object using a first machine learning (ML) model;
      generate a labeled mask based on a second ML model;
      assign labels to the texture space mask based on the labeled mask to obtain a labeled texture space mask; and
      generate a 3D mask based on the labeled texture space mask.

2. The apparatus of claim 1, wherein the first ML model comprises a promptable segmentation ML model configured to generate a segmentation mask for the view of the 3D model based on one or more prompt points.

3. The apparatus of claim 2, wherein the second ML model comprises semantic segmentation ML model, and wherein the labeled mask is further generated based on the promptable segmentation ML model.

4. The apparatus of claim 3, wherein, to generate the labeled mask, the at least one processor is configured to:
   generate a semantic segmentation mask for the view using the semantic segmentation ML model;
   generate a segmentation mask for the view using the promptable segmentation ML model;
   back project the segmentation mask and the semantic segmentation mask to a 3D space;
   perform per-vertex voting to assign labels from the segmentation mask to vertices of the 3D mesh model to obtain a labeled mesh; and
   generate the labeled mask based on the labeled mesh.

5. The apparatus of claim 4, wherein, to generate the segmentation mask for the view using the promptable segmentation ML model, the at least one processor is configured to:
   generate a set of prompt points for the view; and
   prompt the promptable segmentation ML model using the generated set of prompt points.

6. The apparatus of claim 5, wherein the set of prompt points include a set of random prompt points.

7. The apparatus of claim 5, wherein the at least one processor is further configured to:
   receive a set of candidate segmentation masks from the promptable segmentation ML model based on the generated set of prompt points; and select the segmentation mask from the set of candidate segmentation masks based on a set of rules.

8. The apparatus of claim 7, wherein the set of rules causes the segmentation mask to be selected based on at least one of:

a threshold size; or a determination that the segmentation mask fits within the semantic segmentation mask.

9. The apparatus of claim 4, wherein:

to generate the view of the 3D model based on the rendered 3D model, the at least one processor is configured to generate multiple different views of the 3D model; and to generate the semantic segmentation mask for the view, the at least one processor is configured to:

generate a respective semantic segmentation mask for each view of the multiple different views; and generate a respective segmentation mask for each view of the multiple different views.

10. The apparatus of claim 2, wherein the at least one processor is configured to label one or more parts of an object based on a heuristic.

11. The apparatus of claim 10, wherein the heuristic comprises a vertical position of the one or more parts of the object in the segmentation mask.

12. The apparatus of claim 1, wherein the at least one processor is further configured to:

receive a 3D model, the 3D model including a 3D mesh and a fragmented texture;

align the 3D mesh with a neutral model; and convert the fragmented texture to the texture based on the aligned 3D mesh.

13. The apparatus of claim 1, wherein the object is a person.

14. A method for three-dimensional model segmentation, the method comprising:

rendering, using at least one processor, a three-dimensional (3D) model of an object based on a 3D mesh model and a texture of the object;

generating, using the at least one processor, a view of the 3D model based on the rendered 3D model;

generating, using the at least one processor, a texture space mask based on the texture of the object using a first machine learning (ML) model;

generating, using the at least one processor, a labeled mask based on a second ML model;

assigning, using the at least one processor, labels to the texture space mask based on the labeled mask to obtain a labeled texture space mask; and generating, using the at least one processor, a 3D mask based on the labeled texture space mask.

15. The method of claim 14, wherein the first ML model comprises a promptable segmentation ML model configured to generate a segmentation mask for the view of the 3D model based on one or more prompt points, wherein the second ML model comprises semantic segmentation ML model, and wherein the labeled mask is further generated based on the promptable segmentation ML model, and wherein generating the labeled mask comprises:

generating a semantic segmentation mask for the view using the semantic segmentation ML model;

generating a segmentation mask for the view using the promptable segmentation ML model;

back projecting the segmentation mask and the semantic segmentation mask to a 3D space;

performing per-vertex voting to assign labels from the segmentation mask to vertices of the 3D mesh model to obtain a labeled mesh; and generating the labeled mask based on the labeled mesh.

16. The method of claim 15, wherein generating the segmentation mask for the view using the promptable segmentation ML model comprises:

generating a set of prompt points for the view; and prompting the promptable segmentation ML model using the generated set of prompt points.

17. The method of claim 15, wherein:

generating the view of the 3D model based on the rendered 3D model comprises generating multiple different views of the 3D model;

generating the semantic segmentation mask for the view comprises generating a respective semantic segmentation mask for each view of the multiple different views; and generating the segmentation mask for the view comprises generating a respective segmentation mask for each view of the multiple different views.

18. The method of claim 14, further comprising labeling one or more parts of an object based on a heuristic.

19. The method of claim 18, wherein the heuristic comprises a vertical position of the one or more parts of the object in the segmentation mask.

20. The method of claim 14, further comprising:

receiving a 3D model, the 3D model including a 3D mesh and a fragmented texture;

aligning the 3D mesh with a neutral model; and converting the fragmented texture to the texture based on the aligned 3D mesh.

* * * * *